(12) United States Patent
Chen et al.

(10) Patent No.: US 9,331,811 B2
(45) Date of Patent: May 3, 2016

(54) OPTICAL COMMUNICATIONS NETWORKS, OPTICAL LINE TERMINATIONS AND RELATED METHODS

(75) Inventors: Jiajia Chen, Kista (SE); Lena Wosinska, Sollentuna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 722 days.

(21) Appl. No.: 13/504,077

(22) PCT Filed: Oct. 26, 2009

(86) PCT No.: PCT/SE2009/051221
§ 371 (c)(1),
(2), (4) Date: Jun. 21, 2012

(87) PCT Pub. No.: WO2011/053200
PCT Pub. Date: May 5, 2011

(65) Prior Publication Data
US 2012/0251108 A1     Oct. 4, 2012

(51) Int. Cl.
*H04B 10/272* (2013.01)
*H04J 14/02* (2006.01)

(52) U.S. Cl.
CPC .......... *H04J 14/0297* (2013.01); *H04J 14/025* (2013.01); *H04J 14/0246* (2013.01); *H04J 14/0247* (2013.01); *H04J 14/0252* (2013.01); *H04J 14/0265* (2013.01); *H04J 14/0282* (2013.01); *H04J 14/0291* (2013.01); *H04J 14/0258* (2013.01)

(58) Field of Classification Search
CPC .............. H04J 14/0282; H04J 14/0291; H04J 14/0297; H04J 14/0246; H04J 14/0265; H04J 14/025; H04J 14/0252; H04J 14/0247; H04J 14/0258
USPC ........................................ 398/66–73, 58–64
See application file for complete search history.

(56) References Cited

U.S. PATENT DOCUMENTS

| 5,880,865 | A  | * | 3/1999 | Lu et al. .......................... 398/72 |
| 6,288,806 | B1 | * | 9/2001 | Touma et al. ...................... 398/5 |
| 7,359,637 | B2 | * | 4/2008 | Kim et al. ........................ 398/72 |
| 7,639,908 | B2 | * | 12/2009 | Das et al. ......................... 385/24 |
| 2002/0196491 | A1 | * | 12/2002 | Deng et al. ...................... 359/124 |
| 2005/0036785 | A1 | * | 2/2005 | Tervonen et al. .............. 398/49 |
| 2006/0093360 | A1 | * | 5/2006 | Kim et al. ........................ 398/71 |

(Continued)

OTHER PUBLICATIONS

Xie et al, A Study on Wavelength Division Multiplexing Passive Optical Network, Nov. 2007, SPIE, All Document.*

(Continued)

*Primary Examiner* — Ken N Vanderpuye
*Assistant Examiner* — Dibson Sanchez
(74) *Attorney, Agent, or Firm* — Patents on Demand, P.A.; Brian K. Buchheit; Scott M. Garrett

(57) ABSTRACT

Wireless communication systems are provided including a transmitter and a receiver. The transmitter is configured to transmit a first polarized signal and a second polarized signal to the receiver, and in accordance with an instruction from the receiver, halt transmission of the second polarized signal. The receiver is configured to receive the polarized signals from the transmitter, determine whether or not the reception quality of the second polarized signal is below a threshold, and if so, instruct the transmitter to halt transmission of the second polarized signal.

11 Claims, 10 Drawing Sheets

(56) References Cited

U.S. PATENT DOCUMENTS

| | | |
|---|---|---|
| 2007/0217788 A1* | 9/2007 | Gao et al. .......................... 398/5 |
| 2008/0089684 A1* | 4/2008 | Smith et al. ..................... 398/58 |
| 2008/0138063 A1* | 6/2008 | Akasaka et al. ................. 398/4 |
| 2009/0154939 A1* | 6/2009 | Kim et al. ..................... 398/168 |
| 2010/0196011 A1* | 8/2010 | Liu et al. ........................ 398/79 |
| 2010/0215361 A1* | 8/2010 | Ansari et al. ................... 398/25 |

OTHER PUBLICATIONS

Shin et al, Hybrid WDM TDM PON With Wavelength Selection Free Transmitters, Jan. 2005, Journal of Ligthwave Technology, vol. 23, No. 1, All Document.*

Cheng et al, Performance Analysis of Protection Schemes Compatible with Smooth Migration from TDM PON to Hybrid WDM TDM PON, 2006, Optical Society of America, Alll Document.*

Wang et al, A Broadcast and Select WDM PON and its Protection, 2005, ECOC, Paper We4.P.024, pp. 549-550.*

Sue, A Novel 1 N Protection Scheme for WDM Passive Optical Networks, 2006, IEEE, vol. 18 No. 13, pp. 1472-1474.*

Sue et al., "A novel AWG-based WDM-PON architecture with full protection capability," Optical Fiber Technology, vol. 15, No. 2, pp. 149-160, Mar. 2009.

Cheng et al., "A novel survivable WDM passive optical network," Proceedings of the SPIE—The International Society for Optical Engineering, vol. 7137, pp. 71373B, 2008.

Chan et al., "A Novel WDM Passive Optical Network with Bi-Directional Protection," Proceedings of the International Society for Optical Engineering (SPIE), vol. 4909, pp. 167-173, Jan. 1, 2002.

International Search Report, PCT/SE2009/051221, Jun. 29, 2010.

Chen et al., "High Utilization of Wavelengths and Simple Interconnection Between Users in a Protection Scheme for Passive Optical Networks," IEEE Photonics Technology Letters, vol. 20, No. 6, Mar. 15, 2008.

Chan et al., "A Self-Protected Architecture for Wavelength-Division-Multiplexed Passive Optical Networks," IEEE Photonics Technology Letters, vol. 15, No. 11, Nov. 2003.

Chen et al., "Self-protection scheme against failures of distributed fiber links in an Ethernet passive optical network," Journal of Optical Networking, vol. 5, No. 9, Sep. 2006.

Chen et al., "Analysis of protection schemes in PON compatible with smooth migration from TDM-PON to hybrid WDM/TDM-PON," Journal of Optical Networking, vol. 6, No. 5, May 2007.

Yeh et al, "Self-Healing Ring-Based Time-Sharing Passive Optical Networks," IEEE Photonics Technology Letters, vol. 19, No. 15, Aug. 1, 2007.

* cited by examiner

OPTICAL COMMUNICATIONS NETWORKS, OPTICAL LINE TERMINATIONS AND RELATED METHODS

CROSS-REFERENCE TO RELATED APPLICATION

This application is a 35 U.S.C. §371 national stage application of PCT International Application No. PCT/SE2009/051221, filed on Oct. 26, 2009, the disclosure and content of which is incorporated by reference herein as if set forth in its entirety. The above-referenced PCT International Application was published in the English language as International Publication No. WO 2011/053200 on May 5, 2011.

FIELD OF THE INVENTION

The invention relates to an optical communications network, an optical line termination, a method configuring an optical communications network and a method configuring a protection scheme of an optical communications network

BACKGROUND OF THE INVENTION

Passive optical networks (PONs) utilizing wavelength division multiplexing (WDM) technology are considered to provide a potential solution for low cost, resource efficient access networks and metro networks. PONs typically comprise an optical line termination (OLT), a remote node (RN), optical network units (ONUs), feeder fibres between the OLT and RN, which are shared by all the ONUs, and distribution fibres provided between the RN and each ONU. In order to provide service levels and agreed levels of connection availability within this type of optical communications network, it is necessary to provide protection within the network. Various protection schemes for PONs have been proposed including providing interconnection fibres between neighbouring ONUs to provide protection for the distribution fibres, including a protection scheme for PONs comprising arrayed waveguide gratings (AWGs) which utilizes the cyclic property of the AWGs and provides a neighbouring connection pattern between ONUs, as described by Chen et al, "high utilization of wavelengths and simple interconnection between users in a protection scheme for passive optical networks", Photonics Technology Letters, volume 20, no. 6, 15 Mar. 2008.

SUMMARY OF THE INVENTION

It is an object to provide an improved optical communications network. It is a further object to provide an improved optical line termination. It is a further object to provide an improved method configuring an optical communications network. It is a further object to provide an improved method configuring a protection scheme of an optical communications network.

A first aspect of the invention provides an optical communications network comprising an optical line termination, a first optical multiplexer/demultiplexer, feeder fibres and interconnection fibres. Said first optical multiplexer/demultiplexer comprises a first plurality, N, of input ports and a said first plurality, N, of output ports. Said optical communications network further comprises a second plurality of wavelength division multiplexed passive optical network distribution networks. Each said distribution network is coupled to a respective one of said output ports. Said optical communications network further comprises a third plurality of optical network units. A fourth plurality of said feeder fibres are provided. Each said feeder fibre is coupled between said optical line termination and a respective one of said input ports of said optical multiplexer/demultiplexer. A fifth plurality of said interconnection fibres are provided. Each said interconnection fibre is coupled between a respective pair of said optical network units.

The optical communications network is able to support an ultra large number of users, with thousands or tens of thousands of optical network units being able to be accommodated, within a passive optical network architecture which provides a cost-effective protection scheme. The number of end users/optical network units which can be supported by the optical communications network is significantly larger than known time division multiplexed passive optical networks (TDM PON), wavelength division multiplexed passive optical networks (WDM PON) and hybrid TDM/WDM PON, and is of the same order of magnitude as known cascaded arranged waveguide grating (AWG) based passive optical networks. The interconnection fibres provide the advantage of a shared protection scheme for the distribution networks of the optical communications network.

In an embodiment, a said wavelength division multiplexed passive optical network distribution network comprises a wavelength routed wavelength division multiplexed passive optical network, WRPON, distribution network. Said WRPON distribution network comprises a second optical multiplexer/demultiplexer comprising an input port and a sixth plurality, N', of output ports. In an alternative embodiment, a said wavelength division multiplexed passive optical network distribution network comprises a broadcast and select passive optical network, WPON, distribution network. Said WPON distribution network comprises an optical splitter comprising an input port and a seventh plurality, N", of output ports. In an alternative embodiment, a said wavelength division multiplexed passive optical network distribution network comprises a hybrid wavelength division multiplexed/time division multiplexed passive optical network, hybrid TDM/WDM PON, distribution network. Said hybrid PON comprises a second optical multiplexer/demultiplexer comprising an input port and a sixth plurality, N', of output ports. Each said output port is coupled to a respective optical splitter. Each said optical splitter comprises an input port and a said seventh plurality, N", of output ports.

The number of end users/optical network units which can be supported by the optical communications network thus is significantly larger than known time division multiplexed passive optical networks (TDM PON), wavelength division multiplexed passive optical networks (WDM PON) and hybrid TDM/WDM PON, and is of the same order of magnitude as known cascaded arrayed waveguide grating (AWG) based passive optical networks.

In an embodiment, said feeder fibres comprise L working feeder fibres and K backup feeder fibres. L plus K is less than or equal to N, and K is in the range zero to N−1. The optical communications network is thus able to provide a shared, K:L, protection scheme for the feeder fibres in conjunction with an ultra large number of end users/optical network units.

In an embodiment, each said output port of each said second optical multiplexer/demultiplexer is allocated as a working path output port or as a protection path output port dependent on an identity of said second optical multiplexer/demultiplexer, an identity of said output port, an identity of a free spectral range of said first optical multiplexer/demultiplexer used by said output port, said number of working feeder fibres, L, said first plurality, N, and an identity of a said backup feeder fibre.

The optical communications network is thus configured to provide appropriate working paths and protection paths for each optical network unit or optical splitter.

In an embodiment, each said output port of each said second optical multiplexer/demultiplexer is denoted with an index, i, j. i indicates a respective said second optical multiplexer/demultiplexer and j indicates said output port of said second optical multiplexer/demultiplexer. A said output port of a said second optical multiplexer/demultiplexer is allocated as a working path output port if $j \neq ((i+L+q) \bmod N) + pN$, where $q = 0, 1 \ldots K-1$ and $p = 0, 1 \ldots \alpha-1$, where $N' = \alpha N$. Each said working path output port is coupled to a respective said optical network unit or a respective said optical splitter. A said output port is determined to be a protection path output port if $j = ((i+L+q) \bmod N) + pN$.

The optical communications network is thus configured to provide appropriate working paths and protection paths for each optical network unit or optical splitter, the configuration being dependent upon specific parameters of said network.

In an embodiment, each said working path output port is coupled to a respective said optical network unit or a respective said optical splitter by a respective working distribution fibre. The or each said protection path output port is coupled to each said working distribution fibre by a protection path fibre. The working distribution fibres are thus protected by the protection path fibres and protection paths are provided for each optical network unit or optical splitter.

In an embodiment, a first said optical network unit and a second said optical network unit are paired to protect one another dependent on an identity of said second optical multiplexer/demultiplexers, an identity of said output port of said second optical multiplexer/demultiplexers, to which said first and second optical network units are respectively coupled, an identity of a free spectral range of said first optical multiplexer/demultiplexer used by each said output port, said number of working feeder fibres, L, and an identity of a said backup feeder fibre of each said first and second optical network unit.

The optical communications network is thus configured such that pairs of optical network units are arranged to protect one another, via their respective interconnection fibres, allowing neighbouring optical network units to protect each other. The optical communications network is thus provided with a cost efficient protection scheme.

In an embodiment, when said wavelength division multiplexed passive optical network distribution network comprises a wavelength routed passive optical network, WRPON, distribution network, a said optical network unit is denoted with said index, i, j, of its respective said output port. A first said optical network unit, i1, j1, is coupled to a second said optical network unit, i2, j2, by a respective said interconnection fibre if $(i1+L+q1) \bmod N) + p1 \cdot N = j2$ and $((i2+L+q2) \bmod N) + p2 \cdot N = j1$.

The optical communications network is thus configured such that pairs of optical network units are arranged to protect one another, the configuration being dependent upon specific parameters of the network.

In an embodiment, when said wavelength division multiplexed passive optical network distribution network comprises a hybrid wavelength division multiplexed/time division multiplexed passive optical network, hybrid PON, distribution network, a said optical splitter is denoted with said index, i, j, of its respective said output port. Said optical network units of a first said optical splitter, i1, j1, are coupled to respective said optical network units of a second said optical splitter, i2, j2, if $((i1+L+q1) \bmod N) + p1 \cdot N = j2$ and $((i2+L+q2) \bmod N) + p2 \cdot N = j1$.

The optical communications network is thus configured such that pairs of hybrid PON distribution networks are arranged to protect one another, the optical network units of each pair being connected via respective interconnection fibres. The optical network units in neighbouring distribution networks are thus arranged to protect each other. The optical communications network is thus provided with a cost efficient protection scheme.

In an embodiment, said optical network units of said first optical splitter are coupled to corresponding ones of said optical network units of said second said optical splitter.

In an embodiment, when said wavelength division multiplexed passive optical network distribution network comprises a wavelength division multiplexed broadcast and select passive optical network, WPON, distribution network, each said output port of each said optical splitter is denoted with an index, i, j. i indicates a respective said optical splitter and j indicates said output port of said optical splitter. A said optical network unit coupled to a said splitter is denoted with said index, i, j, of its respective said output port. A first said optical network unit, i1, j1, is coupled to a second said optical network unit, i2, j2, by a respective said interconnection fibre if $((i1+L+q1) \bmod N) + p1 \cdot N = j2$ and $((i2+L+q2) \bmod N) + p2 \cdot N = j1$, where $q = 0, 1 \ldots K-1$ and $p = 0, 1 \ldots c-1$. $(cN-N'')$, where c is a minimal integer to make cN greater than N'', virtual output ports are first added to each said optical splitter.

The optical communications network is thus configured such that pairs of optical network units are arranged to protect one another, the configuration being dependent upon specific parameters of the network.

In an embodiment, said first optical multiplexer/demultiplexer comprises an arrayed waveguide grating. In an embodiment, each said second optical multiplexer/demultiplexer comprises a second arrayed waveguide grating. The passive components of the optical communications network are thus able to be provided as a photonic integrated device within a single chip. The optical communications network is thus a cascaded AWG based passive optical network.

In an embodiment, said optical line termination comprises a said fourth plurality of optical transceiver modules. Each said optical transceiver module comprises a seventh plurality of optical transmitters and a said seventh plurality of optical receivers. Each said optical transmitter and each said optical receiver is denoted with an index, i, j, where i indicates a respective said module and j indicates an operating wavelength. Each said optical transceiver module is coupled to a respective said feeder fibre. The optical communications network is thus arranged to transmit and receive optical signals at said seventh plurality of wavelengths, and thus at said seventh plurality of optical channels, on each feeder fibre.

In an embodiment, a first said optical receiver, i1', j1 and a first said optical transmitter, i1', j1, are arranged to operate as a working optical receiver and a working optical transmitter of a first said optical network unit, i1, j1, dependent on an identity of a said second optical multiplexer/demultiplexer, and an identity of a said output port of said second optical multiplexer/demultiplexer, to which said first optical network unit is coupled, an identity of a said optical transceiver module in which said first optical receiver and said first optical transmitter are provided, and said operating wavelength of said first optical receiver and said first optical transmitter.

In an embodiment, a first said optical receiver, i1', j1 and a first said optical transmitter, i1', j1, are arranged to operate as a working optical receiver and a working optical transmitter of a first said optical network unit, i1, j1, where $i1' = (j1-i1) \bmod N+1$. The optical communications network is thus arranged such that each optical network unit has a working optical transmitter and a working optical receiver allocated to it.

In an embodiment, where said first optical network unit, i1, j1, is coupled to a said second optical network unit, i2, j2, a second said optical receiver, i1", j1 and a second said optical transmitter, i1", j1, are arranged to operate as a backup optical receiver and a backup optical transmitter for said first optical receiver, i1', j1 and said first optical transmitter, i1', j1, where i1"=(j1−i2)mod N+1. The optical communications network is thus arranged such that each optical network unit has a backup optical transmitter and a backup optical receiver allocated to it according to the second optical network unit which provides distribution fibre protections paths to it.

In an embodiment, said optical line termination further comprises optical switch apparatus having an eighth plurality, P, of input ports each coupled to a respective said transceiver module and a said fourth plurality of output ports each coupled to a respective said feeder fibre, said optical switch apparatus being arranged to selectively couple said input ports to said output ports.

A second aspect of the invention provides an optical line termination comprising a first plurality, N, of optical transceiver modules, and a said first plurality of optical to outputs. Each said optical transceiver module comprises a second plurality of optical transmitters and a said second plurality of optical receivers. Each said optical transmitter and each said optical receiver are denoted with an index, i, j, where i indicates a respective said module and j indicates an operating wavelength. Each said optical transceiver module is coupled to a respective said optical output. Each said optical output is arranged to be coupled to a respective optical network unit.

In an embodiment, each said optical network unit is coupled to an output port, denoted i, j, of a respective optical multiplexer/demultiplexer. Each said optical output is arranged to be coupled to a respective said optical network unit via a respective said optical multiplexer/demultiplexer. A first said optical receiver and a first said optical transmitter are arranged to operate as a working optical receiver and a working optical transmitter of a said optical network unit dependent on an identity of said respective optical multiplexer/demultiplexer, an identity of a said output port of said optical multiplexer/demultiplexer to which said optical network unit is coupled, an identity of said optical transceiver module in which said first optical receiver and said first optical transmitter are provided, and said operating wavelength of said first optical receiver and said first optical transmitter.

The optical line termination is thus arranged such that each optical transmitter and receiver is allocated as a working optical transmitter and a working optical receiver for a respective optical network unit.

In an embodiment, said first optical receiver, i1', j1 and said first optical transmitter, i1', j1, are arranged to operate as a working optical receiver and a working optical transmitter for a first said optical network unit, i1, j1, where i1'=(j1−i1)mod N+1.

The optical line termination is thus arranged such that each optical transmitter and each optical receiver is allocated as a working optical transmitter and a working optical receiver in accordance with an algorithm which is simple to implement.

In an embodiment, said first optical network unit, i1, j1, is coupled to a second said optical network unit, i2, j2. A second said optical receiver, i1", j1 and a second said optical transmitter, i1", j1, are arranged to operate as a backup optical receiver and a backup optical transmitter for said first optical receiver, i1', j1 and said first optical transmitter, i1', j1, where i1"=(j1−i2)mod N+1.

The optical line termination is thus arranged such that a first optical network unit coupled to the optical line termination has a backup optical transmitter and a backup optical receiver allocated to it according to an algorithm which takes into account a second optical network unit to which the first optical network unit is coupled. The allocation of a backup optical transmitter and receiver can thus take account of any protection paths existing between the first and second optical network units.

In an embodiment, said optical line termination further comprises optical switch apparatus having a said first plurality, P, of input ports each coupled to a respective said transceiver module and a third plurality of output ports arranged to be coupled to a respective said optical multiplexer/demultiplexer, said optical switch apparatus being arranged to selectively couple said input ports to said output ports.

A third aspect of the invention provides a method of configuring an optical communications network. Said optical communications network comprises a first optical multiplexer/demultiplexer comprising a first plurality, N, of input ports and a said first plurality, N, of output ports. Said optical communications network further comprises at least one second optical multiplexer/demultiplexer comprising an input port and a second plurality of output ports. Said optical communications network further comprises L working feeder fibres and K backup feeder fibres. Said method comprises the steps:
 a. selecting a said output port of a said second optical multiplexer/demultiplexer;
 b. obtaining an identity of said second optical multiplexer/demultiplexer;
 c. obtaining an identity of said output port;
 d. obtaining an identity of a free spectral range of said first optical multiplexer/demultiplexer used by said output port,
 e. obtaining an identity of a said backup feeder fibre used by said output port;
 f. allocating said output port as a working path output port or as a protection path output port dependent on said number of working feeder fibres, L, said first plurality, N, said identity of said second optical multiplexer/demultiplexer, said identity of said output port, said identity of said free spectral range and said identity of said backup feeder fibre; and
 g. repeating steps a. to f. for each said output port.

The invention thus enables working paths and protection paths to be configured within an optical communications network in a manner which takes account of the structure and operating configuration of the network.

In an embodiment, each said output port of said second optical multiplexer/demultiplexer is denoted with an index, i, j, where i indicates said second optical multiplexer/demultiplexer and j indicates said output port of said second optical multiplexer/demultiplexer. A said output port is allocated as a working path output port if j≠((i+L+q)mod N)+pN, where q=0, 1 . . . K−1 and p=0, 1 . . . α−1, where N'=αN and K is a number of back-up feeder fibres, and a said output port is allocated as a protection path output port if j=((i+L+q)mod N)+pN.

The invention thus provides an algorithm which enables the configuration of working paths and protection paths within an optical communications network in a manner which is both reliable and straightforward to implement.

In an embodiment, said optical communications network comprises a plurality of said second optical multiplexers/demultiplexers and each said output port of each respective said second optical multiplexer/demultiplexer is denoted with an index, i, j, where i indicates said respective second optical multiplexer/demultiplexer and j indicates said output port of said respective second optical multiplexer/demultiplexer. A said output port is allocated as a working path output port if $j \neq ((i+L+q) \mod N)+pN$, where $q=0, 1 \ldots K-1$ and $p=0, 1 \ldots \alpha-1$, where $N'=\alpha N$ and K is a number of back-up feeder fibres, and a said output port is determined to be a protection path output port if $j=((i+L+q) \mod N)+pN$.

A fourth aspect of the invention provides a method of configuring a protection scheme of an optical communications network. Said optical communications network comprises a first plurality of optical network units, a first optical multiplexer/demultiplexer comprising a second plurality, N, of input ports and a said first plurality, N, of output ports. Said network further comprises a third plurality of second optical multiplexers each comprising an input port and a fourth plurality of output ports. Each said optical network unit is coupled to a respective said output port. Said network further comprises L working feeder fibres and K backup feeder fibres. Said method comprises:
  a. selecting a first said optical network unit and a second said optical network unit;
  b. obtaining an identity of each said respective second optical multiplexer/demultiplexer to which said first and second optical network units are coupled;
  c. obtaining an identity of each said respective output port of said respective second optical multiplexer/demultiplexer to which said first and second optical network units are respectively coupled;
  d. obtaining an identity of a free spectral range of said first optical multiplexer/demultiplexer used by each said respective output port;
  e. obtaining an identity of a said backup feeder fibre of each said first and second optical network unit;
  f. pairing a first said optical network unit and a second said optical network unit to protect one another dependent on said number of working feeder fibres, L, said identities of said respective second optical multiplexer/demultiplexers, said identities of said respective output ports, said free spectral range and said identity of said backup feeder fibres; and
  g. repeating steps a. to f. for each unpaired said optical network unit until each said optical network unit is so paired.

The invention thus provides a method of configuring a protection scheme in dependence upon the specific structure and operating configuration of the network.

In an embodiment, each said second optical multiplexer/demultiplexer is provided within a wavelength routed passive optical network distribution network. Said method comprises denoting each said optical network unit with an index, i, j, where i indicates a respective said second optical multiplexer/demultiplexer and j denotes a respective said output port. Said method further comprises coupling a first said optical network unit, i1, j1, to a second said optical network unit, i2, j2, if $((i1+L+q1) \mod N)+p1 \cdot N = j2$ and $((i2+L+q2) \mod N)+p2 \cdot N = j1$.

The invention thus provides a method of configuring a protection scheme in dependence upon the specific structure and operating configuration of the network by means of algorithms which are reliable and straightforward to implement.

In an embodiment, each said second optical multiplexer/demultiplexer is provided within a hybrid wavelength division multiplexed/time division multiplexed to passive optical network distribution network. Said method comprises denoting a said optical splitter with an index, i, j, of its respective said second optical splitter, where i indicates a respective said second optical multiplexer/demultiplexer and j denotes a respective said output port. Said method further comprises coupling said optical network units of a first said optical splitter, i1, j1, to respective said optical network units of a second said optical splitter, i2, j2, if $((i1+L+q1) \mod N)+p1 \cdot N = j2$ and $((i2+L+q2) \mod N)+p2 \cdot N = j1$.

The invention thus provides a method of configuring a protection scheme in dependence upon the specific structure and operating configuration of the network by means of algorithms which are reliable and straightforward to implement.

In an embodiment, each said second optical multiplexer/demultiplexer is provided within a wavelength division multiplexed broadcast and select passive optical network distribution network comprising a fourth plurality, N", of optical splitters each having a fifth plurality of output ports. Said method comprises denoting each said output port of each said optical splitter with an index, i, j, where i indicates a respective said optical splitter and j indicates said output port of said optical splitter. Said method further comprises denoting a said optical network unit coupled to a said splitter with said index, i, j, of its respective said output port. Said method further comprises adding (cN−N") virtual output ports to each said optical splitter, where c is a minimal integer to make cN greater than N". Said method further comprises coupling a first said optical network unit, i1, j1, to a second said optical network unit, i2, j2, if $((i1+L+q1) \mod N)+p1 \cdot N = j2$ and $((i2+L+q2) \mod N)+p2 \cdot N = j1$, where $q=0, 1 \ldots K-1$ and $p=0, 1 \ldots c-1$.

The invention thus provides a method of configuring a protection scheme in dependence upon the specific structure and operating configuration of the network by means of algorithms which are reliable and straightforward to implement.

Embodiments of the invention will now be described by way of example only, with reference to the accompanying drawings.

DESCRIPTION OF EMBODIMENTS OF THE INVENTION

Figure 1:
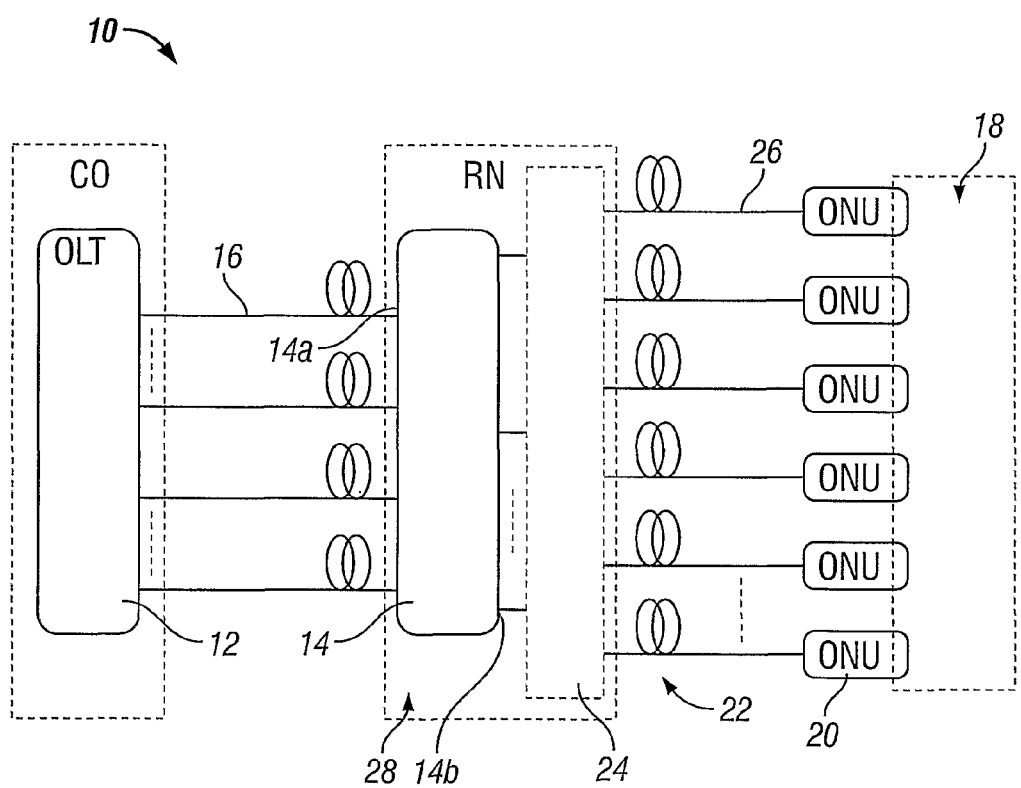
FIG. 1 is schematic representation of an optical communications network according a first embodiment of the invention.

Referring to FIG. 1, a first embodiment of the invention provides an optical communications network 10 comprising an optical line termination (OLT) 12, a first optical multiplexer/de-multiplexer (MUX/DEMUX) 14, feeder fibres 16, interconnection to fibres 18, optical network units 20 and wavelength division multiplexed (WDM) passive optical network (PON) distribution networks 22.

In this example, the OLT 12 is provided within the central office (CO) of the network 10.

The first MUX/DEMUX 14 comprises of first plurality, N, of input ports 14a and a first plurality, N, of output ports 14b. Only four input ports 14a and three output ports 14b are shown in FIG. 1 for reasons of clarity.

The WDM PON distribution networks 22 are each coupled to a respective one of the output ports 14b of the first MUX/DEMUX 14. A WDM PON distribution network is here understood to mean the routing elements 24 and distribution fibres 26 of a WDM PON.

The feeder fibres 16 are each coupled between the OLT 12 and a respective one of the input ports 14a of the first MUX/DEMUX 14. The interconnection fibres 18 are each coupled between a respective pair of ONUs 20, to thereby provide a protection scheme for the distribution fibres 26.

In this example, the first MUX/DEMUX 14 and the routing elements 24 are provided within a remote node (RN) 28.

Referring to FIG. 2a, each WDM PON distribution network may comprise a wavelength routed passive optical network (WRPON) distribution network 30 comprising a second MUX/DEMUX 32, which in this example takes the form of an arrayed waveguide grating (AWG), having one input port and N' output ports. In this example, the first MUX/DEMUX 14 comprises an N×N AWG having N input ports and N output ports.

Referring to FIG. 2b, the WDM PON distribution network may alternatively comprise a WDM broadcast and select PON (WPON) 34 comprising a second optical MUX/DEMUX in the form of an optical splitter 36 having one input port and N" output ports.

Figure 2C:
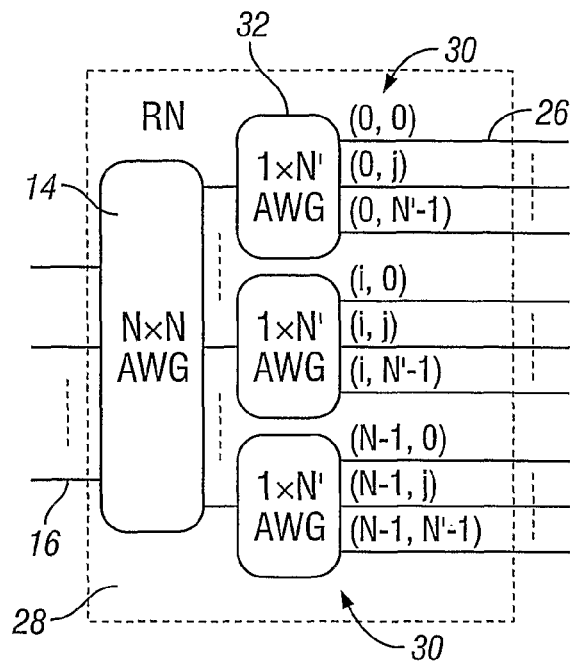
FIG. 2 shows schematic representations of wavelength division multiplexed passive optical network distribution networks for use with the network of FIG. 1, comprising: a) a WRPON; b) a WRPON; and c) a hybrid WDM/TDM PON.
Figure 2C:
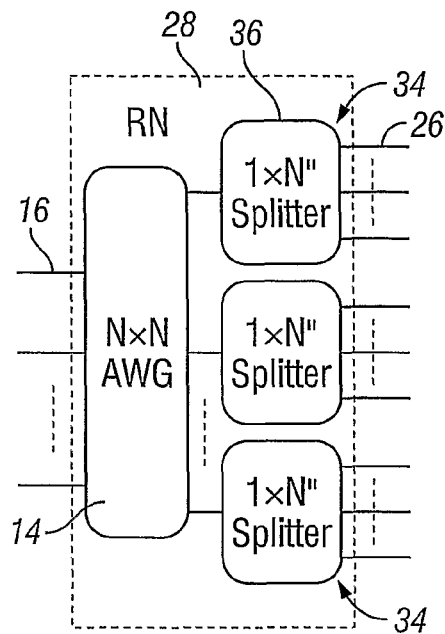
Figure 2C:
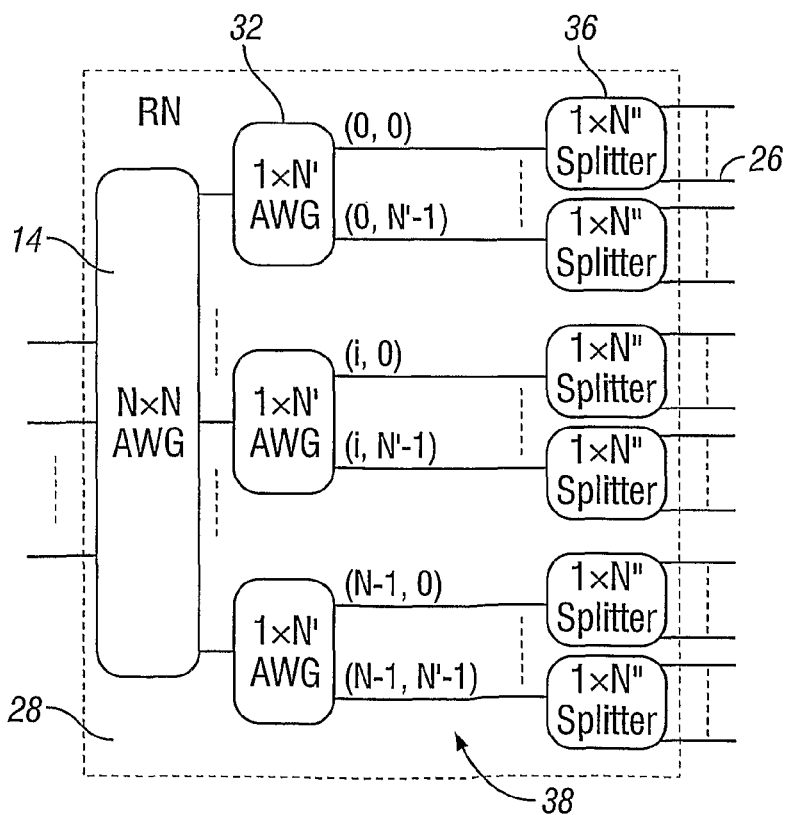

Referring to FIG. 2c, the WDM PON distribution network may further alternatively comprise the distribution network of a hybrid time division multiplexed (TDM)/WDM PON 38. Each hybrid TDM/WDM PON distribution network 38 comprises a second optical MUX/DEMUX 32 in the form of an AWG, as shown in FIG. 2a, and a plurality of optical splitters 36, as shown in FIG. 2b.

The number of ONUs 20 which may be supported by the optical communications network 10 utilizing a WRPON distribution network 30, as shown in FIG. 2a, is up to $\alpha(N)^2$, where $\alpha$ is any positive integer, $\alpha N$ is the total number of available wavelengths for use within the network 10 and N is the number of input and output ports of the first MUX/DEMUX 14. The number of ONUs 20 which may be supported by the optical communications network 10 utilizing a WPON distribution network 34, as shown in FIG. 2b, is up to N"N, where N" is the number of output ports of each optical splitter 36. The total number of ONUs 20 which may be supported by an optical communications network utilizing a hybrid TDM/WDMPON distribution network 38, as shown in FIG. 2c, is N" $\alpha(N)^2$, where N" is the number of output ports of each optical splitter 36.

Figure 3:
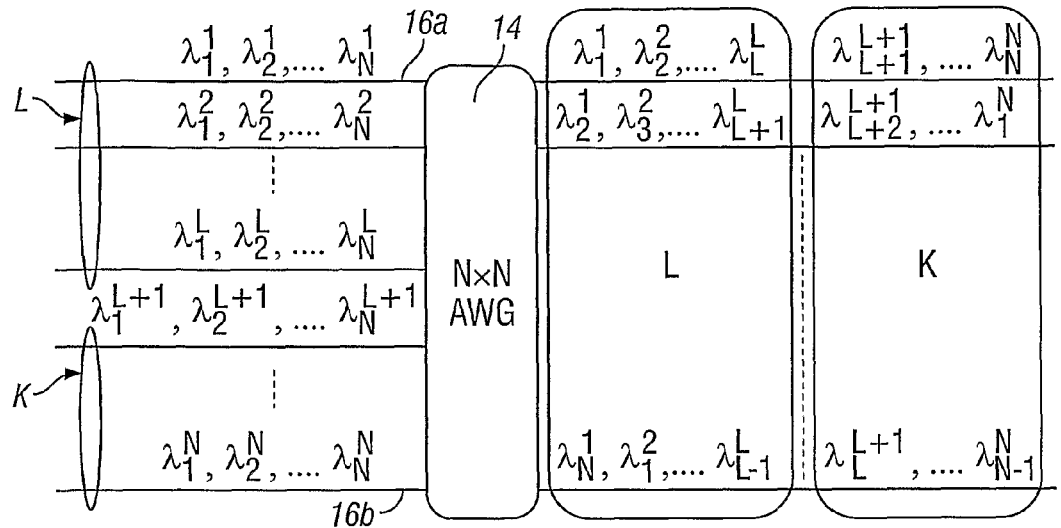
FIG. 3 is a schematic representation of a distribution network of the optical communications network of FIG. 1, illustrating the distribution of working channels and back up channels.

Referring to FIG. 3, the feeder fibres 16 of the optical communications network 10 may be allocated as working feeder fibres (L) 16a or as backup feeder fibres (K) 16b. The example shown in FIG. 3 is for a more general N×N AWG, having N input ports and N output ports. In this example, each feeder fibre 16 receives optical signals at wavelengths λ1 to λN, which are routed by the AWG 14 to respective output ports, to provide L working optical channels and K backup optical channels to the optical communications network 10. The AWG 14 is operating in a cyclic manner, such that each output port outputs optical signals at each of the λ1 to λN wavelength channels.

FIG. 3 shows the distribution of working and back-up wavelength channels within a single FSR at an output of the N×N AWG. The wavelengths are denoted $\lambda_j^i$ which indicates that the wavelength is the j-th wavelength delivered to the i-th input port of the N×N AWG.

Figure 4:
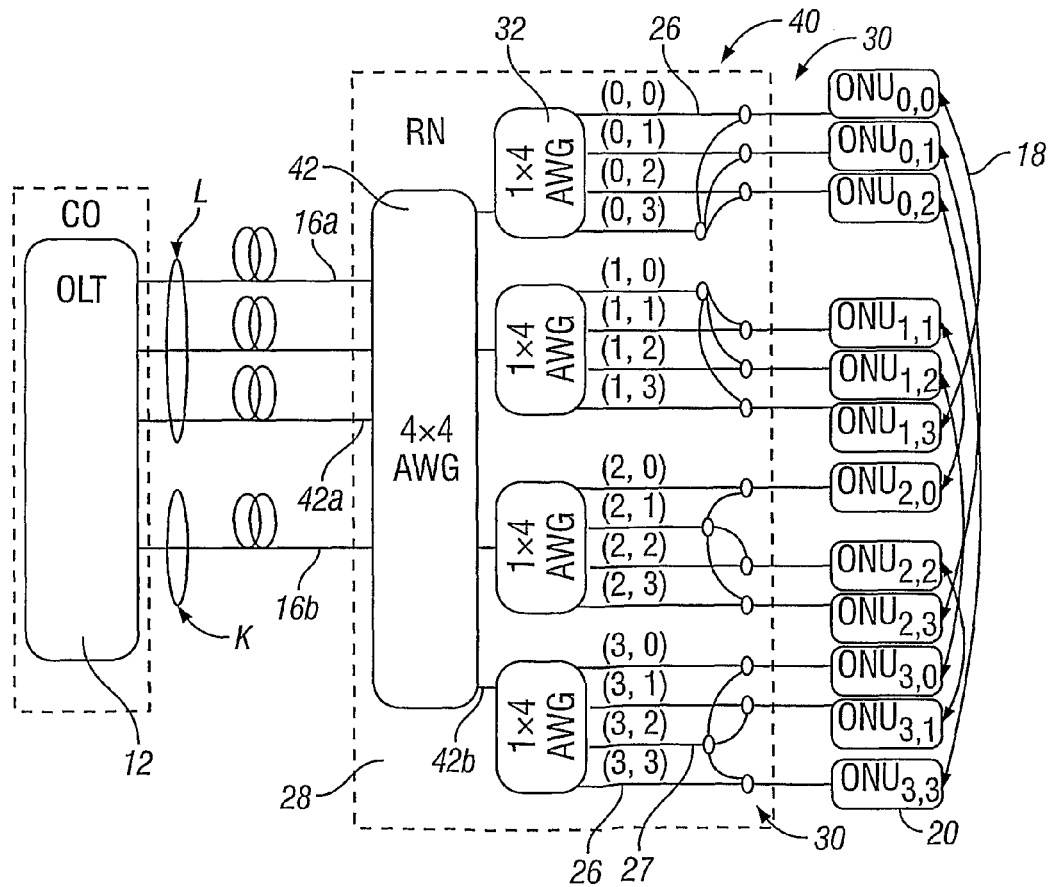
FIG. 4 is a schematic representation of an optical communications network according to a second embodiment of the invention.

Referring to FIG. 4, a second embodiment of the invention provides an optical communications network 40 which is substantially the same as the optical communications network 10 of FIG. 1 and comprises WDM PON distribution networks of the WRPON type 30 as shown in FIG. 2a. The same reference numbers are used for corresponding features.

In this example the first MUX/DEMUX comprises an AWG 42 having four input ports 42a and four output ports 42b. The optical communications network 40 comprises four feeder fibres 16, of which three are allocated as working feeder fibres (L) 16a and one is allocated as a backup feeder fibre (K) 16b.

The optical communications network 40 comprises four WRPON distribution networks 30, each comprising an AWG 32 having one input and four output ports, and three distribution fibres 26. The optical communications network 40 further comprises twelve ONUs 20 and a plurality of interconnecting fibres 18.

Each of the working distribution fibres 26 of each WRPON distribution network 30 is coupled to a respective ONU 20. Each backup fibre 27 comprises three branches which are respectively coupled to the working distribution fibres 26. The backup fibre 27 of each WRPON distribution network 30 thus provides a backup path for each of its respective working distribution fibres 26 should one of the working distribution fibres 26 fail.

The free spectral range (FSR) of each second AWG 32 should be a times the FSR of the first AWG 42, where αN is the total number of available wavelengths within the optical communications network 40 and N is the number of input and output ports of the first AWG 42.

The total of the working feeder fibres 16a and the backup feeder fibres 16b (L+K) is equal to or less than the number of input ports of (N) of the first AWG 42. If the sum of L and K is less than an N, the full capacity of the optical communications network 40 is not being utilized. In this example, L+K=N, such that the capacity of the optical communications network 40 is fully utilized, however it should be noted that the configuration of the optical communications network 40 will work equally for the case where L+K is less than N.

The output ports of each second AWG 32 are denoted by an index (i, j) where i denotes the output port of the first AWG 42 to which the second AWG 32 is coupled, and consequently denotes the second AWG 32, and j denotes the output port of a specific second AWG 32. The output ports of the second AWGs 32 must be allocated as either a working path output port or as a protection path output port.

The output ports of the second AWGs 32 are allocated as working path output ports dependent on the identity of the second AWG 32 (j), the identity of the output port (i), a free spectral range (FSR) of the first AWG 42 used by the output port being allocated, the number of working feeder fibres (L) 16a, the number of input ports and output ports of the first AWG 42 and the identity of the backup feeder fibre 16b to be used. The output ports of the four second AWGs 32 are considered together and are allocated as working path output ports if $$j \neq ((i+L+q) \bmod N) + pN \quad \text{(Equation 1)}$$

where q=0, 1 . . . K−1 and p=01 . . . α−1.

In this example K=1 (there is one back-up feeder fibre), therefore q=0. The number of output ports (N') of each second AWG 32 is the same as the number of input and output ports (N) of the first AWG 42, therefore α=1 and therefore p can only equal 0. The parameters for this equation for FIG. 4 are therefore: N=N−=4, K=1, L=3, α−1, q=0 and p=0. The output ports which can be allocated as working path output ports are therefore those for which j≠(i+3)mod 4 and the output ports which are allocated as back-up output ports are those for which j=(i+3)mod 4, namely ports (0, 3), (1,0), (2,1) and (3,2).

The optical communications network 40 further comprises a protection scheme for protecting the ONUs 20. The ONUs 20 are arranged into pairs, which are connected by respective interconnection fibres 18 to protect one another. A first ONU 20 and a second ONU 20 are paired together to protect one another dependent on the identity of the respective second AWGs 32, and of the output port of their respective second AWG 32 to which the ONU is connected, an identity of the FSR of the first AWG 42 used by each output port, the number of working path feeder fibres (L) 16a, and the identity of the backup feeder fibre 16b used by each ONU 20.

Each ONU 20 is provided with an index (i, j) which corresponds to the respective output port of the respective second AWG 32 to which it is coupled. Three ONUs 20 are coupled to each second AWG 32, via the working path distribution fibres 26. A first ONU ((i1, j1) is coupled to a second ONU (i2, j2) by a respective interconnection fibre 18 if $$((i1+L+q1) \bmod N) + p1 \cdot N = j2 \quad \text{(Equation 2)}$$

and $$((i2+L+q2) \bmod N) + p2 \cdot N = j1 \quad \text{(Equation 3)}$$

Each of the equation parameters correspond to those described above in relation to equation 1, with the index 1 or 2 indicating that the parameter relates to either the first ONU or the second ONU of a pair. Two ONUs can protect each other in the case where the respective second AWG output port in one ONU corresponds to a possible protection path for the second ONU.

In this example, the parameters are: N=N'=4, K=1, L=3, α=1, p1=p2=0 and q1=q2=0. Taking for example ONU (0, 0) as the first ONU (i1, j1), equations 2 and 3 above indicate that ONU (1, 3) forms the second ONU (i2, j2) of the pair, as follows:

$$((i1+L+q1) \bmod N) + p1 \cdot N = j2 \rightarrow (0+3+0) \bmod 4 = 3 \quad (2)$$

$$((i2+L+q2) \bmod N) + p2 \cdot N = j1 \rightarrow (1+3+0) \bmod 4 = 0 \quad (3)$$

An interconnection fibre 18 thus extends between ONU (0,0) and ONU (1,3). Each other ONU within the optical communications network is similarly paired with a second ONU.

Figure 5:
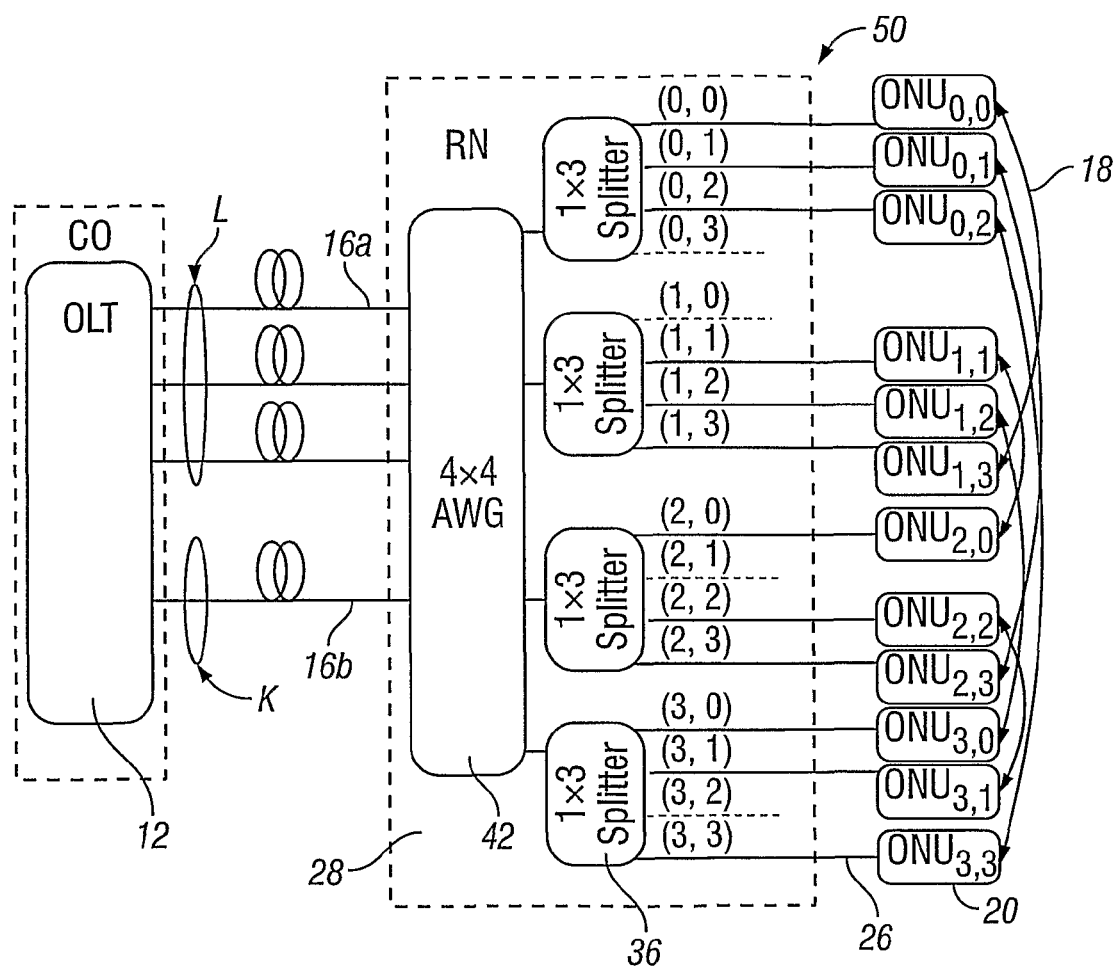
FIG. 5 is a schematic representation of an optical communications network according to a third embodiment of the invention.

An optical communications network 50 according to a third embodiment of the invention is shown in FIG. 5. The optical communications network 50 is substantially the same as the optical communication network 40 of FIG. 4, with the following modifications. The same reference numbers are retained for corresponding features.

In this example, each WDM PON distribution network comprises a WPON distribution network 34, as shown in FIG. 2b. Each optical splitter 36 has one input port and three output ports. Back-up fibres do not need to be provided, since each distribution fibre 26 receives the same set of wavelength channels from the respective optical splitter 36. Each output port of the optical splitter 36 is therefore a working path output port and is coupled to a respective ONU 20.

The ONUs are arranged in protection pairs in the same manner as described above in relation to FIG. 4, with the following modification. In order for equations 2 and 3 described above to work with the optical communications network 50 of this embodiment, it is necessary to first add one or more virtual output ports to each optical splitter 36. The number of virtual output ports which must be added is cN−N", where N" is the number of output ports of an optical splitter 36. c is the minimal integer to make cN larger than N". In this example, cN−N"=1×4−3=1. Therefore one virtual output port is added to each optical splitter 36. Equations 2 and 3 described above are therefore used with the parameters N, N"=cN, K, L and α=c to arrange the ONUs 20 into pairs.

Figure 6:
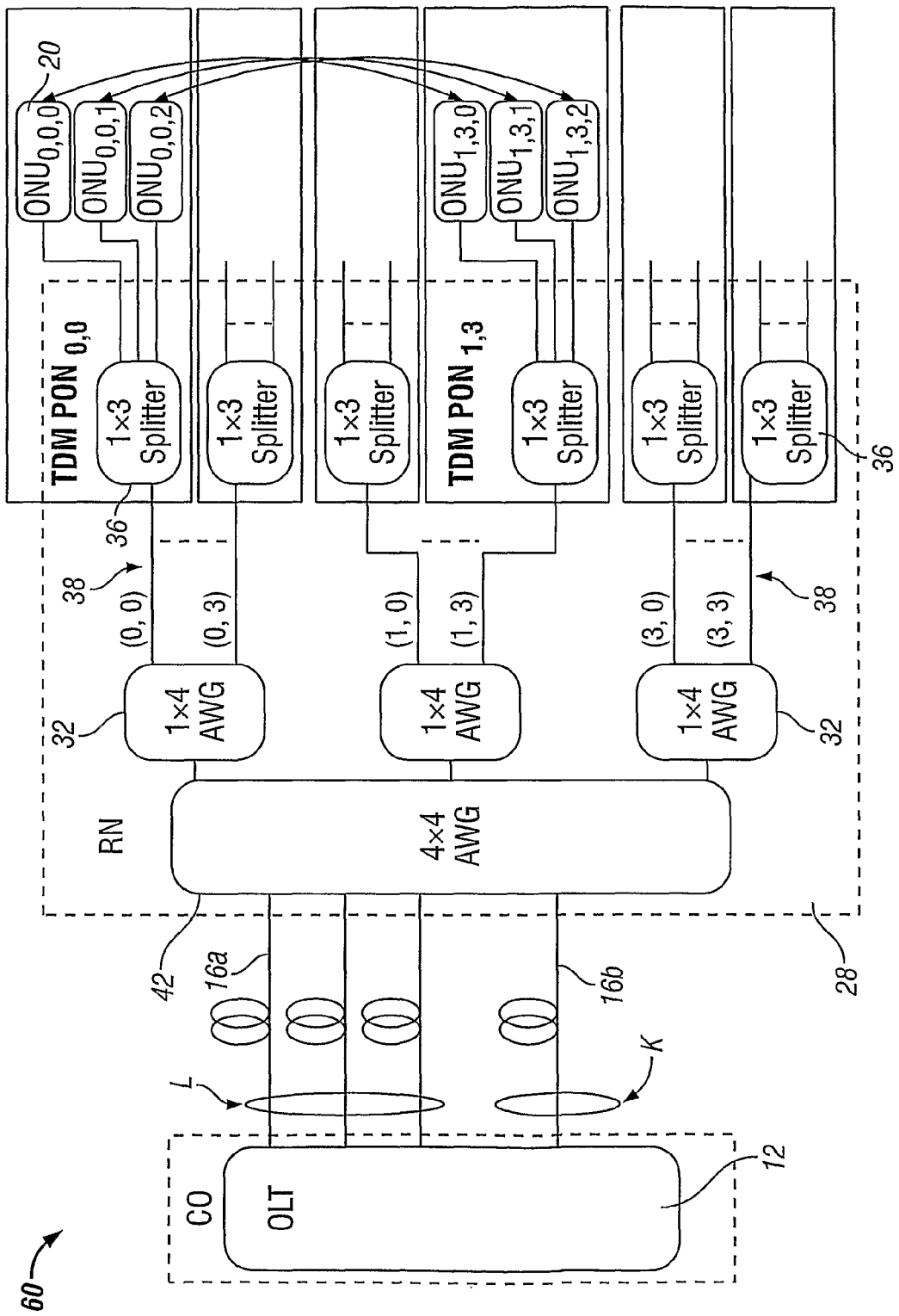
FIG. 6 is a schematic representation of an optical communications network according to a fourth embodiment of the invention.

An optical communications network 60 according to a fourth embodiment of the invention as shown in FIG. 6. The optical communications network 60 is substantially the same as the optical communications network 40 of FIG. 4, with the following modifications. The same reference numbers are retained for corresponding features.

In this embodiment, each WDM PON distribution network comprises a hybrid TDM/WDM PON distribution network 38, as shown in FIG. 2c. Only three of the second AWGs 32 are shown for clarity, and only two optical splitters 36 and their corresponding ONUs 20 are shown for each hybrid PON 38. Each hybrid PON 38 therefore comprises a 1×4 AWG 32 and four TDM PONs each comprising a 1×3 optical splitter 36 and three ONUs 20.

In this embodiment, the ONUs 20 are arranged in protection pairs by pairing their corresponding TDM PONs, each ONU within a TDM PON being paired with a corresponding ONU in its paired TDM PON. Each TDM PON is provided with an index (i, j) corresponding to the output port of its respective second AWG 32 to which it is coupled. The TDM PONS are arranged in protection pairs using equations 2 and 3 as described above. In TDM PON (i1, j1) and TDM PON (i2, j2) the neighbouring ONU (i1, j1, k) and ONU (i2, j2, k) can form a pair to protect each other, where k=0, 1 . . . N"−1. TDM PON (0,0) is thus paired with TDM PON (1, 3), with each ONU 20 within the respective TDM PON being paired with its corresponding ONU in the paired TDM PON.

Figure 7:
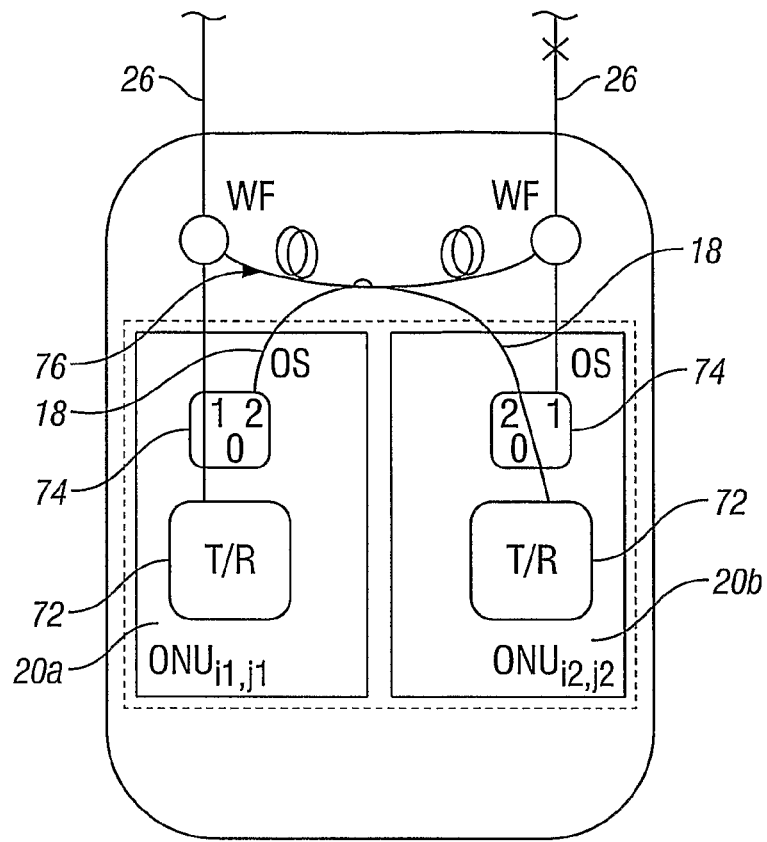
FIG. 7 is a schematic representation of first and second optical network units of any of the optical communication networks of FIGS. 1 to 6.

FIG. 7 shows the arrangement of distribution fibres 26 and interconnection fibre 18 between a first ONU (i1, j1) 20a and a second ONU (i2, j2) 20b. This arrangement of connecting pairs of ONUs 20 is applicable to each of the above described optical communication networks 10, 40, 50, 60 and the same reference numbers are retained for corresponding features.

Each ONU 20 comprises a transceiver 72 and an optical switch 74. The distribution fibre 26 of each ONU 20 is connected to the optical switch 74 of its paired ONU via a wavelength selective filter (WF) 76 and its respective interconnection fibre 18. Each wavelength selective filter 76 is arranged to transmit optical signals at the operating wavelength of the transceiver 72 of its paired ONU 20. During normal operation, the optical switch 74 is set to port 1, making a direct connection of the working distribution fibre 26a to its respective ONU. Where a distribution fibre 26 breaks, a protection path is provided for the respective ONU 20b by the distribution fibre 26 of its paired ONU 20a, by the optical switch 74 of the ONU 20b being set to port 2, such that the distribution fibre 26a of its paired ONU 20a is coupled to the transceiver 72 via the respective switch 74.

Figure 8:
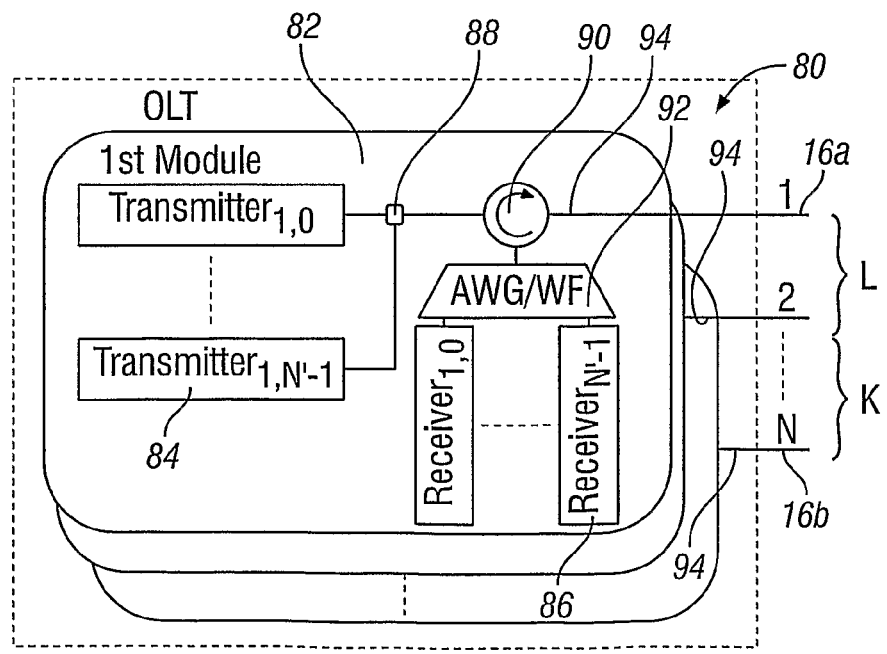
FIG. 8 is a schematic representation of an optical line termination according to a fifth embodiment of the invention.

An optical line termination (OLT) 80 according to a fifth embodiment of the invention is shown in FIG. 8. The OLT 80 is suitable for use with any of the above described optical communications networks 10, 40, 50, and 60. The same reference numbers are retained for corresponding features.

The OLT 80 comprises a plurality (N) of optical transceiver modules 82 and a said plurality (N) of output ports 94. Each optical transceiver module 82 comprises a plurality, N', of optical transmitters 84 and a plurality, N', of optical receivers 86. Each optical transceiver module 82 is provided with one output port 94, which is arranged to be coupled to a respective optical network unit 20, initially via a respective feeder fibre 16. In this example, the transmitters 84 are coupled to the respective output port 94 via a multiplexer 88 and an optical circulator 90. The optical receivers 86 are coupled to the respective output port 94 via the optical circulator 90 and a wavelength selective filter 92, which in this example comprises an arrayed waveguide grating but may alternatively comprise an array of wavelength selective optical filters. Each optical transmitter 84 and each optical receiver 86 is denoted with an index, i, j, where i indicates the optical transmitter module 82 in which the optical transmitter 84 or a receiver 86 is located and j indicates the operating wavelength of the transmitter 84 or receiver 86.

Figure 9:
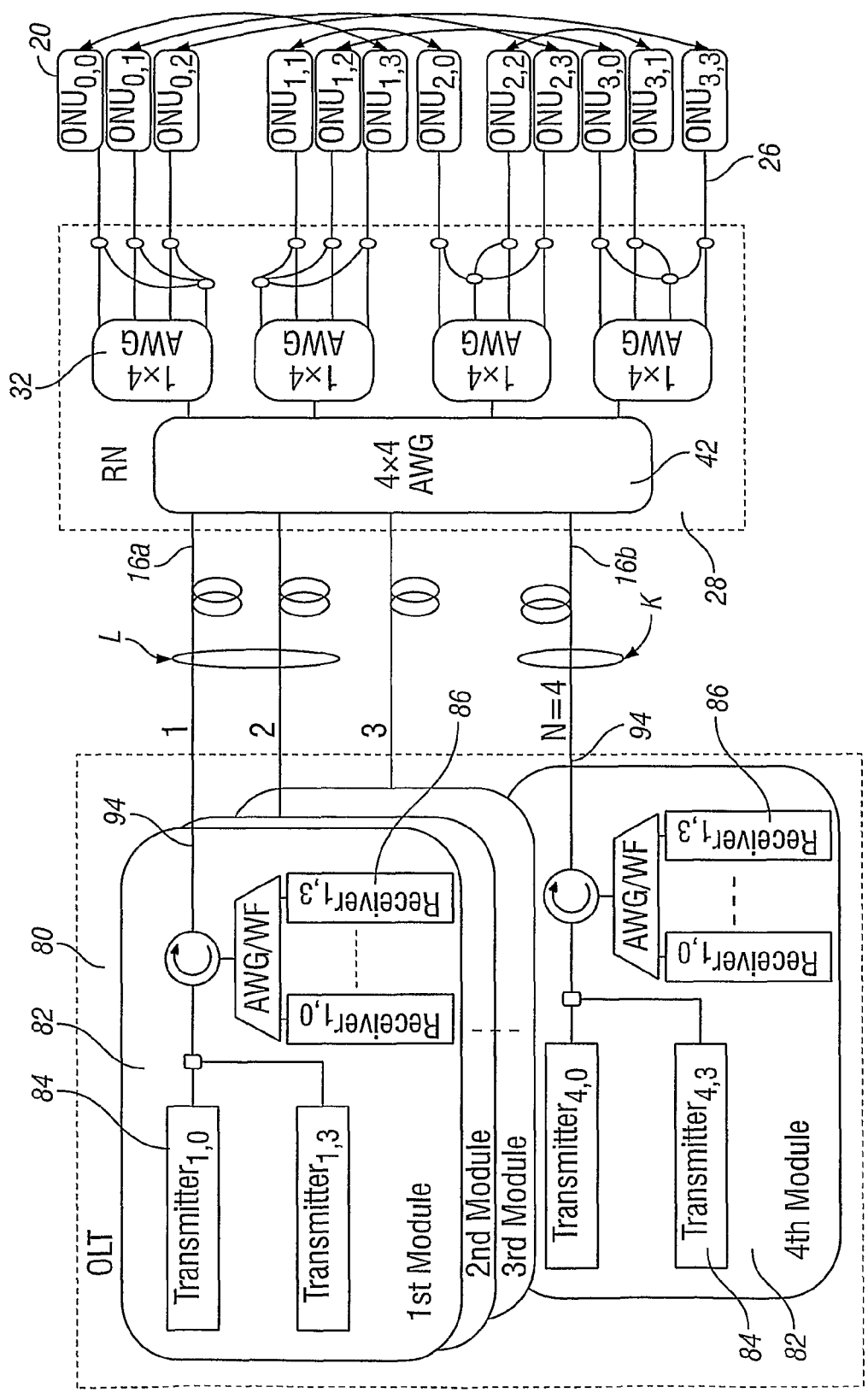
FIG. 9 is a schematic representation of the optical communications network of FIG. 4 showing the optical line termination of FIG. 8 in use within said network.

FIG. 9 shows the OLT 80 of FIG. 8 in use within the optical communications network 40 of FIG. 4. The OLT 80 in this example has four transceiver modules 82.

In this example, the optical transmitters 84 and optical receivers 86 are allocated in pairs to provide both a working transmitter 84 and a working receiver 86 and a back-up transmitter 84 and a back-up receiver 86 for each ONU 20. The optical transmitters 84 and optical receivers 86 are allocated in pairs dependent on the identity of the second AWG 14, 42, the identity of the output port of the second AWG 14, 42 to which a first ONU 20 is coupled, the identity of the optical transceiver module 82 in which a first optical transmitter 84 and first optical receiver 86 are provided, and the operating wavelength of the first optical receiver 86 and the first optical transmitter 84.

A first optical receiver (i1', j1) 84 is arranged to operate as a working optical receiver and a first optical transmitter (i1', j1) is arranged to operate as a working optical transmitter of a first optical network unit (i1, j1), where the following condition is met:

$$i1'=(j1-i1) \bmod N+1 \quad \text{(Equation 4)}$$

As described above, each optical network unit is coupled to a second optical network unit within a protection pair. For a pair of optical network units (i1, j1) and (i2, j2), a second optical receiver (i1", j1) and a second optical transmitter (i1", j1) are arranged to operate as a back-up optical receiver and back-up optical transmitter for the first optical receiver (i1',j1) and the first optical transmitter (i1',j1), where the following condition is met:

$$i1"=(j1-i2) \bmod N+1 \quad \text{(Equation 5)}$$

Each ONU 20 of an optical communications network according to the invention can thus be provided with both a working optical transmitter and receiver and a back-up optical transmitter and receiver. K:L shared protection is thus provided for the transceivers at the OLT 80.

In normal operation, the transmitters 84 and receivers 86 within the transceiver modules 82 coupled to working feeder fibres 16a are used to transmit data traffic. The optical transmitters 84 and receivers 86 within transceiver modules 82 coupled to back-up feeder fibres 16b, which in this example comprises modules L+1 to N, are idle or are used to transmit low priority data traffic. If a transmitter or receiver coupled to a working feeder fibre 16a fails, the allocated back-up transmitter 84 and receiver 86 of the corresponding ONU 20 may be brought into operation to provide continuing data transmission.

Figure 10:
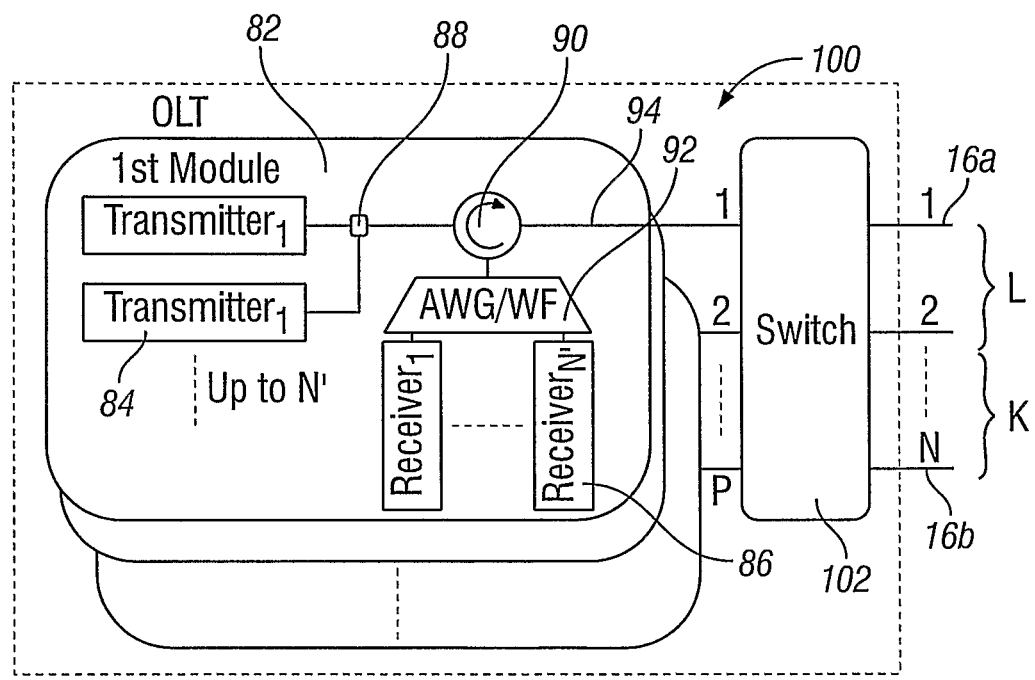
FIG. 10 is a schematic representation of an optical line termination according to a sixth embodiment of the invention.

An OLT 100 according to a sixth embodiment of the invention is shown in FIG. 10. The OLT 100 may similarly be used with any of the above described optical communication networks 10, 40, 50, 60. The OLT 100 is substantially the same as the OLT 80 of FIG. 8, with the following modifications. The same reference numbers are retained for corresponding features.

In this embodiment, the OLT 100 further comprises an optical switch 102. The switch has a plurality of input ports, each of which are coupled to the output port 94 of a respective transceiver module 82. The switch 102 has a plurality, N, of output ports each of which are coupled to a respective feeder fibre 16.

The optical switch apparatus 102 is arranged to selectively couple its input ports to its output ports, to thereby selectively couple the output port 94 of any selected transceiver module 82 to a selected feeder fibre 16, and thus to a selected ONU 20.

The optical transmitters 84 may comprise fixed wavelength lasers or may comprise tunable lasers. The OLT 100 is thus arranged to provide static or dynamic wavelength allocation The OLT 100 is able to support K':L shared protection for the transceivers at the OLT 100, where K' can be 0 to K. Under normal operation, all of the transceiver modules 82 can be assigned to working path feeder fibres 16a by configuring the switch apparatus 102 as appropriate. Should one of the transceiver modules 82 fail, any idle transceiver module 82 or a transceiver module 82 carrying low priority data traffic can be selected to provide protection to replace the failed transceiver module 82.

Figure 11:
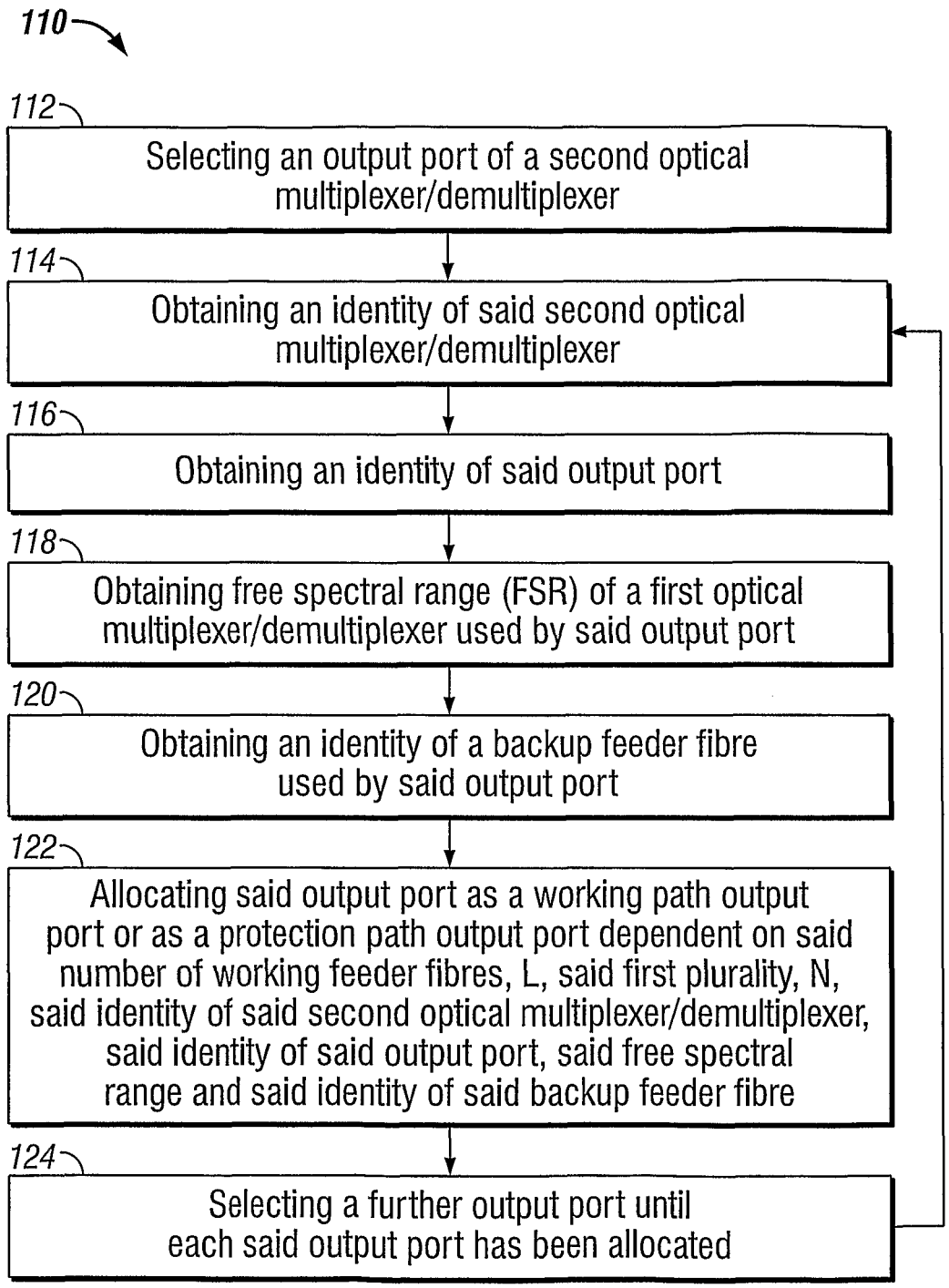
FIG. 11 shows steps of a method of configuring an optical communications network according to a seventh embodiment of the invention.

FIG. 11 shows the steps of a method 110 of configuring an optical communications network according to a seventh embodiment of the invention.

The method 110 is for configuring an optical communications network comprising a first optical multiplexer/de-multiplexer, at least one second optical multiplexer/de-multiplexer, L working feeder fibres and K backup feeder fibres. The first optical multiplexer/de-multiplexer comprises N input ports and N output ports. The second optical multiplexer/de-multiplexer comprises an input port and a plurality of output ports.

The method 110 comprises the steps:
a. Selecting an output port of a second optical multiplexer 112;
b. Obtaining an identify of the second optical multiplexer/de-multiplexer 114;
c. Obtaining an identity of said output port 116;
d. Obtaining an identity of a free spectral range (FSR) of the first optical multiplexer/de-multiplexer used by the said output port 118;
e. Obtaining an identity of a backup feeder fibre used by the said output port 120;

f. Allocating the output port as a working path output port or as a protection path output port dependant on the number of working feeder fibres L, the number of input and output ports, N, the identity of the second optical multiplexer/de-multiplexer, the identity of the output port, the identity of the free spectral range and the identity of the backup feeder fibre 122.

The method further comprises selecting a further output port and repeating steps a. to f. until each output port has been allocated as a working path output port or as a protection path output port 124.

In a further embodiment, each output port of each second optical multiplexer/de-multiplexer is denoted with an index, i, j. i indicates the second optical multiplexer/de-multiplexer and j indicates the output port. An output port is allocated as a working path output port if j≠(i+L+q)mod N)+pN, where q=0, 1 ... K−1 and p=0, 1 ... α−1, where N'=αN and K is a number of back-up feeder fibres. An output port is allocated as a protection path output port if j=+((i+L+q)mod N)+pN.

In a further embodiment, the optical communications network comprises a plurality of said second optical multiplexers/de-multiplexers, each being denoted with an index i, j. Each said output port is allocated as a working path output port or as a protection path output port as described above.

Figure 12:
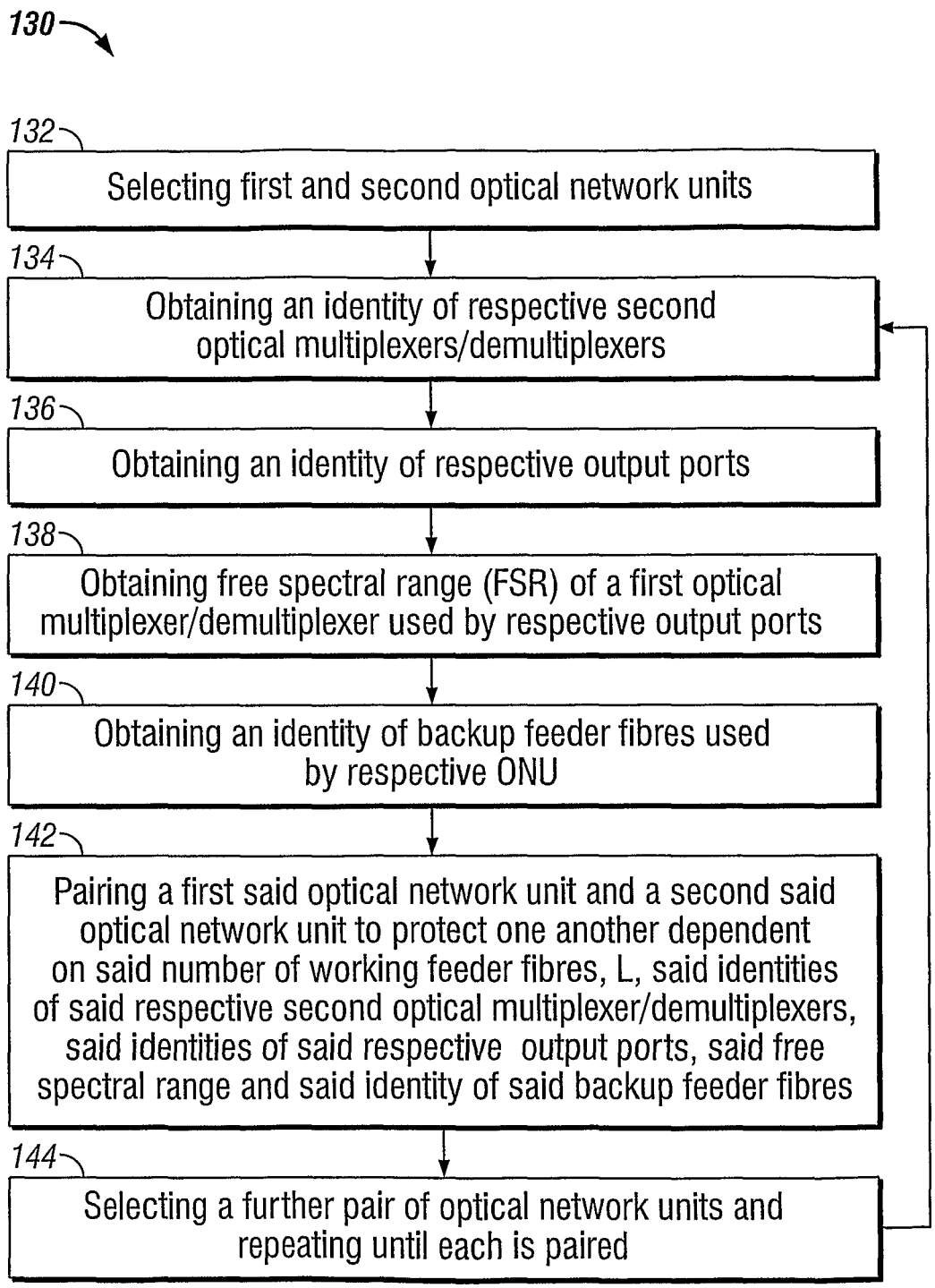
FIG. 12 shows steps of a method of configuring a protection scheme of an optical communications network according to an eighth embodiment of the invention.

An eighth embodiment of the invention provides a method 130 of configuring a protection path scheme of an optical communications network, as illustrated in FIG. 12.

The method 130 is for an optical communications network comprising a first plurality of optical network units, a first optical multiplexer/de-multiplexer, a second plurality of second optical multiplexers/de-multiplexers, L working feeder fibres and K backup feeder fibres. The first optical multiplexer/de-multiplexer comprises N input ports and N output ports. Each second optical multiplexer/de-multiplexer comprises a single input port and a plurality of output ports.

The method 130 comprises:
a. Selecting first and second optical network units 132;
b. Obtaining an identity of the respective second optical multiplexers/de-multiplexers to which the first and second optical network units are coupled 134;
c. Obtaining an identity of said respective output port of said respective second optical multiplexer/de-multiplexer to which said first and second optical network units are each respectively coupled 136;
d. Obtaining an identity of a free spectral range of the first optical multiplexer/de-multiplexer used by the respective output ports 138;
e. Obtaining identity of the backup feeder fibre used by each of the first and second optical network units 140;
f. Pairing the first and second optical network units dependent on the number of working feeder fibres, L, the identities of the respective second optical multiplexers/de-multiplexers, the identities of the respective output ports, the free spectral range and the identity of the backup feeder fibres 142.

The method 130 further comprises selecting a further pair of optical network units and repeating steps b. to f. until each optical network unit is arranged in a pair 144.

In a further embodiment, each second optical multiplexer/de-multiplexer is provided within a wavelength routed passive optical network distribution network. The method comprises denoting each optical network unit with an index i, j. i indicates the respective second optical multiplexer/de-multiplexer to which the optical network unit is coupled and j denotes the respective output port to which the optical network unit is coupled within the second optical multiplexer/de-multiplexer. The method comprises coupling a first optical network unit, i1, j1, to a second optical network unit i2, j2 if (i1+L+q1)mod N)+p1·N=j2 and ((i2+L+q2)mod N)+p2·N=j1.

In a further embodiment, each second optical multiplexer/de-multiplexer is provided within a hybrid wavelength division multiplexed/time division multiplexed passive optical network distribution network comprising at least one optical splitter. The method comprises denoting a said optical splitter with an index, i, j, of its respective second optical multiplexer/de-multiplexer. i indicates the second optical multiplexer/de-multiplexer to which the optical splitter is coupled and j denotes the output port of the second optical multiplexer/de-multiplexer to which the optical splitter is coupled. The method comprises coupling the optical network units of a first optical splitter, i1, j1, to respective optical network units of a second optical splitter i2, j2, if ((i1+L+q1)mod N)+p1·N=j2 and ((i2+L+q2)mod N)+p2·N=j1.

In a further embodiment, each second optical multiplexer/de-multiplexer is provided within a wavelength division multiplexed broadcast and select passive optical network distribution networks comprising a fourth plurality, in ", of optical splitters. Each optical splitter has a plurality of output ports. The method comprises denoting each output port of each optical splitter with an index i, j. i indicates the optical splitter and j indicates the output port of the optical splitter. The method further comprises denoting an optical network unit coupled to a said optical splitter with the index, i, j, of its respective output port to which it is coupled. The method further comprises adding (cN−N") virtual output ports to each optical splitter. c is a minimal integer to make cN greater than N". The method further comprises coupling a first optical network unit, i1, j1, to a second optical network unit, i2, j2, if ((i1+L+q1)mod N)+p1·N=j2 and ((i2+L+q2)mod N)+p2·N=j1, where q=0, 1 ... K−1 and p=0, 1 ... c−1.

The invention claimed is:
1. An optical communications network comprising:
an optical line termination;
a first optical multiplexer/demultiplexer comprising a first plurality (N) of input ports and a first plurality (N) of output ports;
a plurality of wavelength division multiplexed passive optical network distribution networks, each coupled to a respective one of the plurality of output ports;
a plurality of optical network units;
a plurality of feeder fibers, each coupled between the optical line termination and a respective one of the plurality of input ports; and
a plurality of interconnection fibers each coupled between a respective pair of the plurality of optical network units, wherein each wavelength division multiplexed passive optical network distribution network comprises one of:
a wavelength routed wavelength division multiplexed passive optical network distribution network comprising a second optical multiplexer/demultiplexer comprising an input port and a second plurality (N') of output ports;
a broadcast and select passive optical network distribution network comprising an optical splitter comprising an input port and a plurality (N") of output ports; and
a hybrid wavelength division multiplexed/time division multiplexed passive optical network distribution network comprising a second optical multiplexer/demultiplexer comprising an input port and a second plurality (N') of output ports each coupled to a respective optical splitter comprising an input port and a plurality of output ports, wherein a first network unit and a second network unit of said plurality of optical network units are paired to protect one another dependent on an identity of the second optical multiplexer/demultiplexer, an identity of the output port of the second optical multiplexer/demultiplexer, to which the first and second network units are respectively coupled, an identity of a free spectral range of the first optical multiplexer/demultiplexer used by each output port, the number of working feeder fiber (L) and an identity of the backup feeder fiber of each of the first and second network units.

2. The optical communications network of claim 1, wherein said feeder fibers comprise L working feeder fibers and K backup feeder fibers, where L plus K is less than or equal to (N) and K is in the range zero to N−1.

3. The optical communications network of claim 1, wherein, when the wavelength division multiplexed passive optical network distribution network comprises a hybrid wavelength division multiplexed/time division multiplexed passive optical network distribution network, the optical splitter is denoted with the index, i, j, of its respective output port, the optical network units of a first optical splitter, i1, j1, are coupled to respective said optical network units of a second said optical splitter, i2, j2, if:

$$((i1+L+q1) \bmod N)+p1 \cdot N=j2 \text{ and } ((i2+L+q2) \bmod N)+p2 \cdot N=j1,$$

where i indicates an optical multiplexer/demultiplexer; j indicates an output port of the optical multiplexer/demultiplexer; L is a number of feeder fibers; q=0, 1 ... K−1; K is a number of backup feeder fibers; p=0, 1 ... α−1; α is any positive integer and N is a number of input/output ports.

4. The optical communications network of claim 1, wherein the first optical multiplexer/demultiplexer comprises an arrayed waveguide grating.

5. The optical communications network of claim 1, wherein each second optical multiplexer/demultiplexer comprises a arrayed waveguide grating.

6. The optical communications network of claim 1, wherein the optical line termination comprises a plurality of optical transceiver modules, each optical transceiver module comprising a plurality of optical transmitters and a plurality of optical receivers, each optical transmitter and each optical receiver being denoted with an index, i, j, where i indicates a respective module and j indicates an operating wavelength, and each optical transceiver module is coupled to a respective feeder fiber.

7. The optical communications network of claim 6, wherein a first optical receiver, i1', j1 and a first optical transmitter, i1', j1, are arranged to operate as a working optical receiver and a working optical transmitter of the first network unit, i1, j1, dependent on an identity of a second optical multiplexer/demultiplexer, and an identity of the output port of the second optical multiplexer/demultiplexer, to which the first network unit is coupled, an identity of the optical transceiver module in which the first optical receiver and the first optical transmitter are provided, and the operating wavelength of the first optical receiver and the first optical transmitter.

8. The optical communications network of claim 7, wherein a first optical receiver, i1', j1 and a first optical transmitter, i1', j1, are arranged to operate as a working optical receiver and a working optical transmitter of the first network unit, i1, j1, where i1'=(j1−i1) mod N+1, where i indicates an optical multiplexer/demultiplexer; j indicates an output port of the optical multiplexer/demultiplexer; and N is a number of input/output ports.

9. The optical communications network of claim 8, wherein the first network unit is coupled to the second network unit, a second optical receiver and a second optical transmitter are arranged to operate as a backup optical receiver and a backup optical transmitter for the first optical receiver and the first optical transmitter.

10. An optical line termination comprising a first plurality (N) of optical transceiver modules and a first plurality of optical outputs, each optical transceiver module comprising a plurality of optical transmitters and a plurality of optical receivers, each optical transmitter and each optical receiver being denoted with an index, i, j, where i indicates a respective module and j indicates an operating wavelength, and each optical transceiver module being coupled to a respective optical output, each optical output being arranged to be coupled to a respective optical network unit, wherein a first optical receiver, i1', j1 and a first optical transmitter, i1', j1, are arranged to operate as a working optical receiver and a working optical transmitter for a first optical network unit, i1, j1, where i1'=(j1−i1) mod N+1, where i indicates an optical multiplexer/demultiplexer; j indicates an output port of the optical multiplexer/demultiplexer; and N is a number of input/output ports, and wherein the first optical network unit is coupled to a second optical network unit and a second optical receiver and a second optical transmitter are arranged to operate as a backup optical receiver and a backup optical transmitter for the first optical receiver and the first optical transmitter.

11. The optical line termination of claim 10, wherein each optical network unit is coupled to an output port, denoted i, j, of a respective optical multiplexer/demultiplexer and each optical output is arranged to be coupled to a respective optical network unit via a respective optical multiplexer/demultiplexer, a first optical receiver and a first optical transmitter being arranged to operate as a working optical receiver and a working optical transmitter of the respective optical network unit dependent on an identity of the respective optical multiplexer/demultiplexer, an identity of the output port of the respective multiplexer/demultiplexer to which the respective optical network unit is coupled, an identity of the optical transceiver module in which the first optical receiver and the first optical transmitter are provided, and the operating wavelength of the first optical receiver and the first optical transmitter.

* * * * *